United States Patent
Qin et al.

(10) Patent No.: US 12,375,037 B2
(45) Date of Patent: Jul. 29, 2025

(54) METHOD AND SYSTEM FOR PHOTOVOLTAIC FAULT MONITORING, AND STORAGE MEDIUM

(71) Applicant: SHENZHEN POWEROAK NEWENER CO., LTD, Guangdong (CN)

(72) Inventors: Geng Qin, Guangdong (CN); Hui Ma, Guangdong (CN); Yongbo Zhang, Guangdong (CN); Dan Wen, Guangdong (CN); Chunpei Zhong, Guangdong (CN)

(73) Assignee: SHENZHEN POWEROAK NEWENER CO., LTD, Shenzhen (CN)

( * ) Notice: Subject to any disclaimer, the term of this patent is extended or adjusted under 35 U.S.C. 154(b) by 0 days.

(21) Appl. No.: 18/789,916

(22) Filed: Jul. 31, 2024

(65) Prior Publication Data

US 2025/0219577 A1   Jul. 3, 2025

Related U.S. Application Data

(63) Continuation of application No. PCT/CN2024/080702, filed on Mar. 8, 2024.

(30) Foreign Application Priority Data

Jan. 3, 2024  (CN) .......................... 202410005961.5

(51) Int. Cl.
*H02S 50/00*  (2014.01)
(52) U.S. Cl.
CPC ..................................... *H02S 50/00* (2013.01)
(58) Field of Classification Search
None
See application file for complete search history.

(56) References Cited

U.S. PATENT DOCUMENTS

| | | | | |
|---|---|---|---|---|
| 2013/0015875 A1* | 1/2013 | Kumar | ........... | H02S 50/10 |
| | | | | 324/761.01 |
| 2018/0062392 A1* | 3/2018 | Urabe | ........... | H02J 3/381 |
| 2022/0239107 A1* | 7/2022 | Qiu | ........... | H02J 3/381 |

FOREIGN PATENT DOCUMENTS

| CN | 104990197 A | 10/2015 |
|---|---|---|
| KR | 20180106112 A | 10/2018 |

OTHER PUBLICATIONS

Yu Young Gyu et al.; System for Failure Detection of Photovoltaic Module; Date Published Oct. 1, 2018; Applicants LSIS Co Ltd [KR]; KR 20180106112 A;; (Year: 2018).*

(Continued)

*Primary Examiner* — Nasima Monsur
(74) *Attorney, Agent, or Firm* — IPRO, PLLC

(57) ABSTRACT

The present application relates to a photovoltaic fault monitoring system, method and a storage medium. The photovoltaic fault monitoring system includes at least one group of photovoltaic arrays, each including multiple stages of photovoltaic modules connected in series and a processing module connected with the photovoltaic arrays. Each stage of photovoltaic modules includes a photovoltaic unit and a bound monitoring unit. The monitoring unit process and output a received communication signal when the photovoltaic unit is powered, while directly output the received communication signal when the photovoltaic unit loses power. The processing module acquires the communication signal from each monitoring unit to determine if any photovoltaic unit is faulty.

11 Claims, 10 Drawing Sheets

(56) References Cited

OTHER PUBLICATIONS

Liu et al.; Photovoltaic Component String-off Device And Photovoltaic Power Generation System; Date Published Nov. 5, 2021; Applicants Liu Baitao; CN 214626916 U; (Year: 2021).*

* cited by examiner

METHOD AND SYSTEM FOR PHOTOVOLTAIC FAULT MONITORING, AND STORAGE MEDIUM

CROSS-REFERENCE TO RELATED APPLICATIONS

The present application claims priority to Chinese Patent Application No. 2024100059615, filed on Jan. 3, 2024 and entitled "PHOTOVOLTAIC FAULT MONITORING SYSTEM, METHOD AND STORAGE MEDIUM", the entirety of which is incorporated herein by reference.

TECHNICAL FIELD OF THE INVENTION

The present application relates to the technical field of photovoltaics, and in particular, relates to a system and method for photovoltaic fault monitoring, and a storage medium.

BACKGROUND OF THE INVENTION

The application technology of building integrated photovoltaic (BIPV) is to generate electricity by using renewable solar energy, and the BIPV system is increasingly favored by users since it integrates roof tiles with thin-film solar power generation to make buildings generate electricity by themselves through using green and environmentally friendly solar energy resources.

In the fault detection of traditional BIPV system, it is usually necessary to provide multiple detection circuits to detect the total voltage, total current, daily power generation capacity, total power generation capacity and other parameters of the BIPV system in real time in order to determine whether any photovoltaic tile is faulty, so the cost of such a practice is relatively high.

SUMMARY OF THE INVENTION

In a first aspect, the present application provides a photovoltaic fault monitoring system, which includes: at least one group of photovoltaic arrays, each of the photovoltaic arrays comprising multiple stages of photovoltaic modules connected in series, and each of the stages of photovoltaic modules comprising a photovoltaic unit and a monitoring unit bound with the photovoltaic unit; the monitoring unit being configured to process the received communication signal and output the processed communication signal when the power supply of the bound photovoltaic unit normally supplies power, and directly output the received communication signal when the power supply of the bound photovoltaic unit fails to supply power; a processing module, being connected with the at least one group of photovoltaic arrays, and being configured to acquire the communication signal output by each monitoring unit in the photovoltaic arrays, and determine whether the bound photovoltaic unit is faulty according to the communication signal output by each monitoring unit.

In one embodiment, the monitoring unit includes a conversion unit and a main control unit; the conversion unit is configured to directly output the communication signal when the power supply of the bound photovoltaic unit fails to supply power, and transmit the communication signal to the main control unit when the power supply of the bound photovoltaic unit normally supplies power; the main control unit is configured to process the received communication signal and output the processed communication signal.

In one embodiment, each of the monitoring units further includes: an uplink port, being connected with the monitoring unit of the previous stage; a downlink port, being connected with the monitoring unit of the next stage; the conversion unit includes a first relay, and the first relay is connected with the power supply of the bound photovoltaic unit, the uplink port, the downlink port and the main control unit; when the power supply of the bound photovoltaic unit normally supplies power, the first relay is configured to control the uplink port to be connected to the main control unit so as to transmit the communication signal received by the uplink port to the main control unit to be processed and then output to the downlink port; and when the power supply of the bound photovoltaic unit fails to supply power, the first relay is configured to control the uplink port to be connected to the downlink port so as to directly output the communication signal received by the uplink port to the downlink port.

In one embodiment, a first coil in the first relay is connected to the power supply of the bound photovoltaic unit, a first input terminal of the first relay is connected to a transmitting port of the uplink port, a second input terminal of the first relay is connected to a receiving port of the uplink port, a first output terminal and a second output terminal of the first relay are connected to the main control unit, a third output terminal of the first relay is connected to a transmitting port of the downlink port, and a fourth output terminal of the first relay is connected to a receiving port of the downlink port.

In one embodiment, the conversion unit further includes a second relay; the second relay is connected with the power supply of the photovoltaic unit of the previous stage, the power supply of the bound photovoltaic unit and the photovoltaic unit of the next stage; when the power supply of the bound photovoltaic unit normally supplies power, the second relay is configured to control the power supply of the photovoltaic unit of the previous stage to be connected to a common contact; and when the power supply of the bound photovoltaic unit fails to supply power, the second relay is configured to control the power supply of the photovoltaic unit of the previous stage to be connected to the photovoltaic unit of the next stage.

In one embodiment, the conversion unit further includes a switching transistor and an optical coupler; the optical coupler is connected with the second relay, the switching transistor and the first coil, and the switching transistor is connected with the first coil; the optical coupler is configured to control the switching transistor to be in a turned-on state so that the first coil is powered on when the power supply of the bound photovoltaic unit normally supplies power; and the optical coupler is configured to control the first coil to be powered off when the power supply of the bound photovoltaic unit fails to supply power.

In one embodiment, the processing module is specifically configured to: determine that the bound photovoltaic unit is faulty and output fault information if it is detected that communication signals output by one of the monitoring units within a first preset duration are all unprocessed communication signals; and/or determine that the bound photovoltaic unit is faulty and output the fault information if it is detected that communication signals output by one of the monitoring units within a preset period of time are all unprocessed communication signals.

In one embodiment, the first preset duration and/or the preset period of time are set based on current weather information.

In one embodiment, the processing module is further configured to acquire preset identification information in a faulty photovoltaic unit, and acquire position information of the faulty photovoltaic unit according to the identification information and a preset photovoltaic planar model corresponding to the at least one group of photovoltaic arrays.

In a second aspect, the present application further provides a photovoltaic fault monitoring method for use in the photovoltaic fault monitoring system described in the first aspect or any embodiment thereof, and the photovoltaic fault monitoring method includes: inputting a detecting communication signal to the at least one photovoltaic array; acquiring a communication signal fed back by each monitoring unit in the photovoltaic array based on the detecting communication signal; determining whether the bound photovoltaic unit is faulty according to the communication signal output by each monitoring unit.

In one embodiment, the method further includes: acquiring preset identification information of a faulty photovoltaic unit; acquiring a preset photovoltaic planar model corresponding to the at least one group of photovoltaic arrays; acquiring the position information of the faulty photovoltaic unit according to the identification information and the photovoltaic planar model, wherein the photovoltaic planar model contains identification information of each of the photovoltaic units and position information corresponding to the identification information.

In one embodiment, before inputting the detecting communication signal to the at least one photovoltaic array, the method further includes: receiving identification of the bound photovoltaic unit and position information in the photovoltaic array where the bound photovoltaic unit is located which are sent by each monitoring unit in the at least one photovoltaic array; performing modeling on the at least one photovoltaic array to obtain the photovoltaic planar model based on the identification of the bound photovoltaic unit and the position information in the photovoltaic array where the bound photovoltaic unit is located which are sent by each said monitoring unit.

In one embodiment, the operation of determining whether the bound photovoltaic unit is faulty according to the communication signal output by each monitoring unit includes: determining that the bound photovoltaic unit is faulty and outputting fault information if it is detected that communication signals output by one of the monitoring units within a first preset duration are all unprocessed communication signals; and/or determining that the bound photovoltaic unit is faulty and outputting the fault information if it is detected that communication signals output by one of the monitoring units within a preset period of time are all unprocessed communication signals.

In a third aspect, the present application further provides a computer-readable storage medium having a computer program stored thereon, wherein the computer program, when executed by a processor, implements the following steps: inputting a detecting communication signal to the at least one photovoltaic array; acquiring a communication signal fed back by each monitoring unit in the photovoltaic array based on the detecting communication signal; determining whether the bound photovoltaic unit is faulty according to the communication signal output by each monitoring unit.

In a fourth aspect, the present application further provides a computer program product comprising a computer program, and the computer program, when executed by a processor, implements the following steps: inputting a detecting communication signal to the at least one photovoltaic array; acquiring a communication signal fed back by each monitoring unit in the photovoltaic array based on the detecting communication signal; determining whether the bound photovoltaic unit is faulty according to the communication signal output by each monitoring unit.

BRIEF DESCRIPTION OF THE DRAWINGS

In order to explain the technical solutions in the embodiments of the present application or the traditional technology more clearly, attached drawings needed in the description of the embodiments or the traditional technology will be briefly introduced below. Obviously, the attached drawings in the following description are only the embodiments of the present application, and other drawings can be obtained by those of ordinary skill in the art according to the disclosed drawings without making creative efforts.

DETAILED DESCRIPTION OF THE INVENTION

Figure 1:
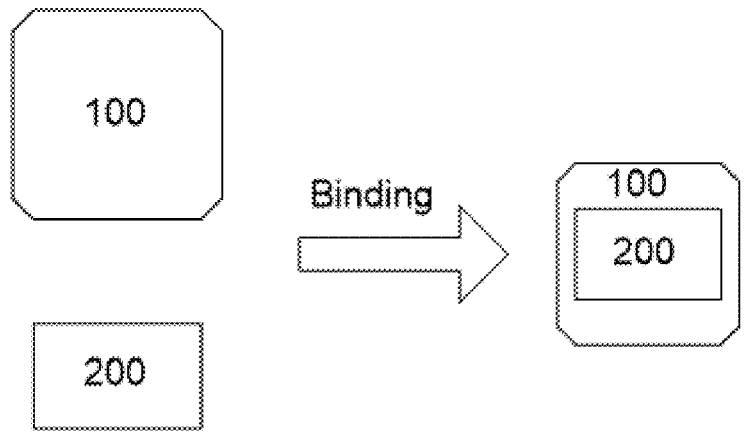
FIG. 1 is a schematic view illustrating a photovoltaic unit bond with a monitoring unit in a photovoltaic module.

The technical solutions of the embodiments of the present application will be described clearly and completely with reference to the attached drawings illustrating the embodiments of the present application. Obviously, the embodiments described herein are only a part of but not all of the embodiments of the present application. All other embodiments that can be obtained by those of ordinary skill in the art from the embodiments of the present application without making creative efforts shall fall within the scope claimed in the present application.

The application technology of building integrated photovoltaic (BIPV) is a technology for generating electricity by using renewable solar energy, and photovoltaic tiles can both be installed on buildings and used as multifunctional building materials to form actual building components. BIPV products and systems are increasingly favored by users since they integrate roof tiles with thin-film solar power generation to make buildings generate electricity by themselves through using green and environmentally friendly solar energy resources.

The current BIPV system has some defects in modeling and fault detection:

(1) Defects in modeling of the traditional BIPV system lie in that: during installing and splicing of photovoltaic tiles, it is necessary to manually number each photovoltaic tile and record the installation position thereof so as to display the installation position of each photovoltaic tile on a terminal system to monitor the photovoltaic tiles, so the installation is inefficient and prone to errors due to the manual coding and positioning.

(2) Defects in fault monitoring of the traditional BIPV system lie in that: default detection is performed on the photovoltaic tiles by sampling and monitoring the total voltage, total current, daily power generation capacity, total power generation capacity and other parameters of the photovoltaic tiles connected in series, but each photovoltaic tile cannot be monitored separately through such a method, and when a certain photovoltaic tile is faulty, it is impossible to exactly identify which one is the faulty photovoltaic tile; if the default detection is performed by providing a detection device on each photovoltaic tile to detect the voltage, current and other parameters of each photovoltaic tile, then each photovoltaic tile can be monitored, but the cost of this approach is high.

In order to solve the defects in modeling of the traditional BIPV system, the present application provides an automatic planar modeling method for a photovoltaic system, which can automatically determine actual physical installation positions of photovoltaic modules according to connection relationships among the photovoltaic modules. Furthermore, the actual physical installation positions can be visually presented on a display terminal, which is convenient for users to check.

In the present application, a photovoltaic system refers to a system consisting of at least one group of photovoltaic arrays, each of the photovoltaic arrays includes multiple stages of photovoltaic modules connected in series, and each of the stages of photovoltaic modules includes a photovoltaic unit and a monitoring unit bound to the photovoltaic unit.

The photovoltaic unit described above may be a photovoltaic tile, a photovoltaic panel, or other photovoltaic devices.

In some embodiments, in the automatic planar modeling method of the photovoltaic system in the present application, the photovoltaic unit may be bound with the monitoring unit as a photovoltaic module before leaving the factory, and the photovoltaic unit and the monitoring unit in one photovoltaic module are represented by a same serial number. That is, the photovoltaic unit and the monitoring unit in one photovoltaic module are regarded as a whole.

Illustratively, FIG. 1 is a schematic view illustrating the binding of a photovoltaic unit in a photovoltaic module with a monitoring unit. In FIG. 1, a photovoltaic unit 100 and a monitoring unit 200 are bound into a photovoltaic module.

Figure 2:
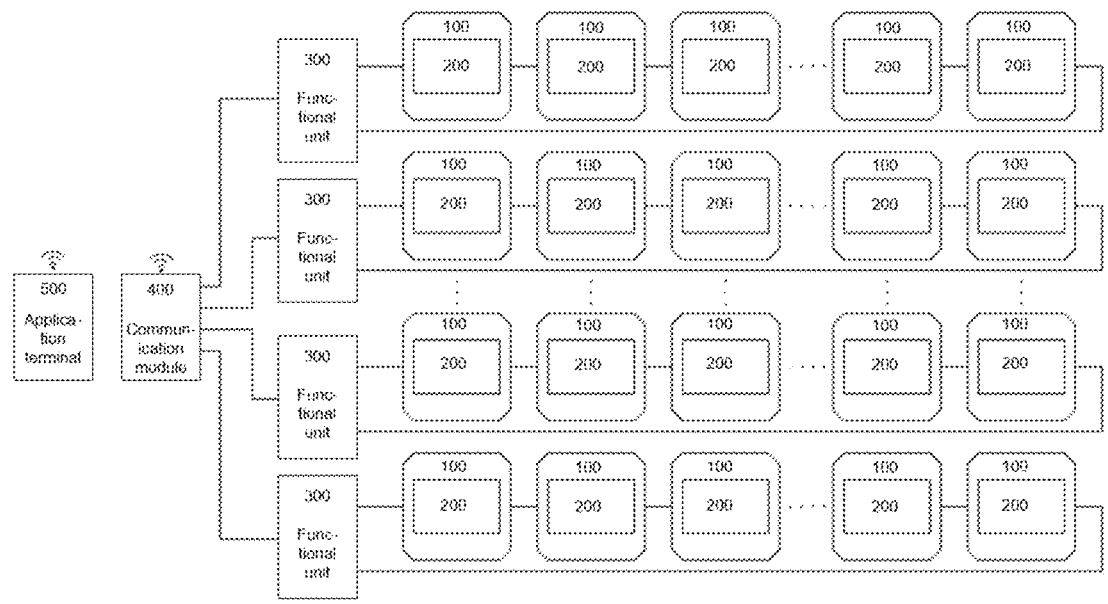
FIG. 2 is a schematic structural diagram of a photovoltaic system.

Illustratively, FIG. 2 is a schematic structural diagram of a photovoltaic system, the photovoltaic system includes a plurality of groups of photovoltaic arrays, and each photovoltaic array includes multiple stages of photovoltaic modules connected in series, that is, multiple stages of photovoltaic modules connected in series in sequence. Each of the stages of photovoltaic modules includes the photovoltaic unit 100 and the monitoring unit 200 bound to the photovoltaic unit 100, each photovoltaic array is connected with a functional unit 300 (for example, four groups of the photovoltaic arrays and four functional units are taken as an example in FIG. 2), and these functional units 300 is in turn connected to a communication module 400 which may communicate with an application terminal 500.

The functional unit 300 in the photovoltaic system shown in FIG. 2 may be a functional element with communication function or a micro inverter with communication function, and the main function of the functional unit 300 in FIG. 2 described above is to send and/or receive communication signals of connected photovoltaic modules (the photovoltaic unit 100 and the monitoring unit 200 bound to the photovoltaic unit 100) and communicate with the communication module 400. It shall be noted that in some scenes, the functional module may not be adopted in the photovoltaic system, that is, the functional unit 300 in the photovoltaic system is optional.

The communication module 400 in FIG. 2 described above is used to communicate with various functional modules and photovoltaic units, and send the collected information of photovoltaic units to the terminal so that information of the photovoltaic system can be displayed on the terminal.

In some embodiments, the functional unit 300 and the communication module 400 in FIG. 2 described above may be integrated into one processing module or serve as two independent modules.

In some embodiments, the photovoltaic modules in each photovoltaic array in the photovoltaic system of the present application are connected hand in hand to realize series connection of power loop and cascade connection of communication loop. In the communication loop, a downlink port of the monitoring unit of the previous stage supplies power to an uplink port of the monitoring unit of the next stage to ensure the normal realization of the communication function of the monitoring unit of the previous stage by the monitoring unit of the next stage.

In some embodiment, the monitoring unit at each stage in the present application determines the actual row position of the photovoltaic unit connected at the back end in the photovoltaic array through question-and-answer and response of communication. The actual column position of the photovoltaic unit bound to the monitoring unit at each stage may be determined through switching question and answer and response of communication between the communication module and the functional unit as well as between the functional unit and the monitoring unit of the first stage in the photovoltaic array, thereby realizing the overall planar physical positioning.

Figure 3:
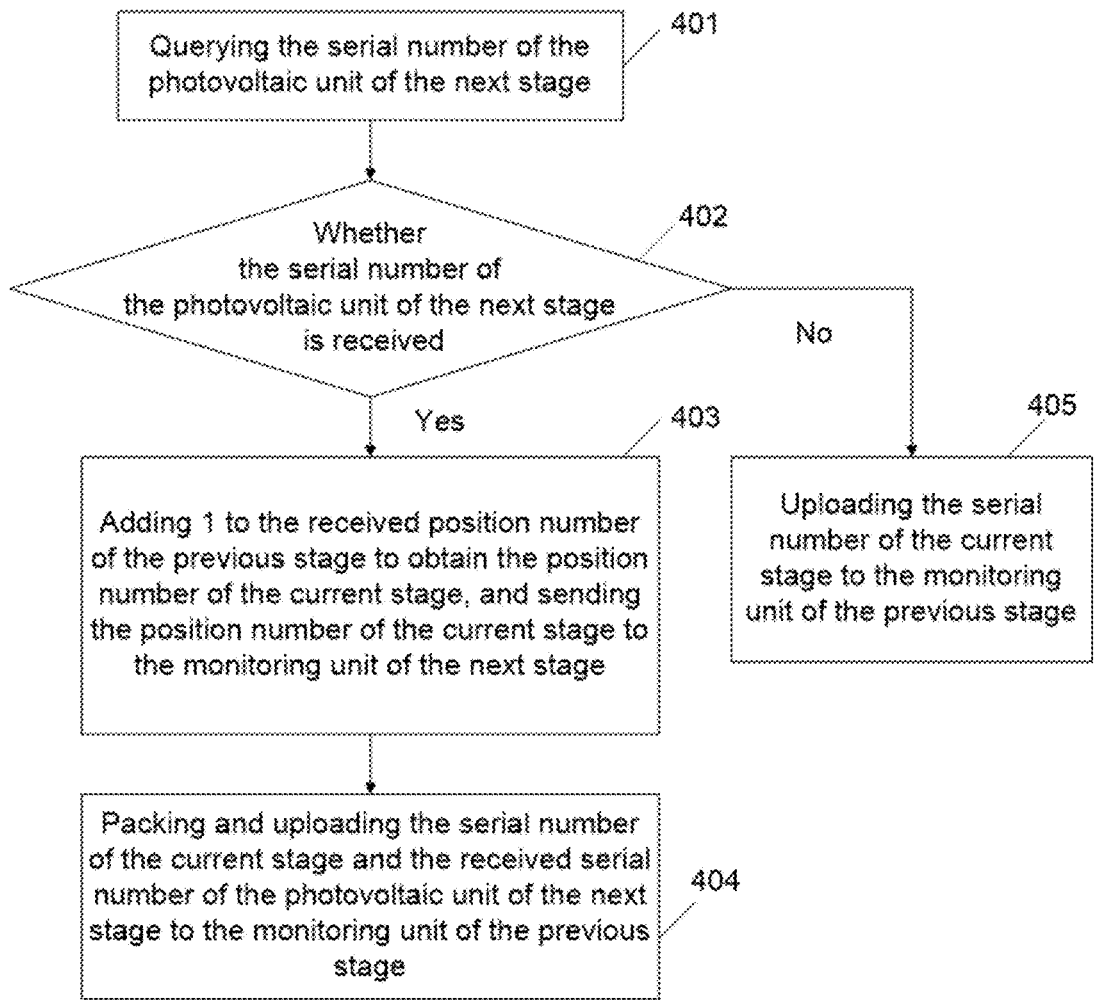
FIG. 3 is a schematic view illustrating the process flow of serial communication for a monitoring unit.

Illustratively, FIG. 3 is a schematic view illustrating the process flow of serial communication for a monitoring unit, and the communication flow may include the following steps:

401. querying the serial number of the photovoltaic unit of the next stage.

The serial number of the photovoltaic unit is also the serial number of the monitoring unit. The serial number of the photovoltaic unit is used to uniquely indicate the photovoltaic unit.

402. determining whether the serial number of the photovoltaic unit of the next stage is received.

The serial number of the photovoltaic unit of the next stage is also the serial number of the monitoring unit of the next stage.

If the serial number of the photovoltaic unit of the next stage is received, then it means that there is a photovoltaic unit of the next stage, and at this point, the following steps 403 and 404 may be executed. If the serial number of the photovoltaic unit of the next stage is not received, then it means that there is no photovoltaic unit of the next stage, and then the following step 405 may be executed.

403. adding 1 to the received position number of the previous stage to obtain the position number of the current stage, and sending the position number of the current stage to the monitoring unit of the next stage.

Illustratively, if the position number of the previous stage is "1", then the current stage may add 1 after receiving "1" to obtain a position number of "2" for the current stage so that the position of the monitoring unit at each stage can be numbered, and in this way, the position of the monitoring unit in the photovoltaic array can be known through the position number thereof.

404. packing and uploading the serial number of the current stage and the received serial number of the photovoltaic unit of the next stage to the monitoring unit of the previous stage.

405. uploading the serial number of the current stage to the monitoring unit of the previous stage.

In the photovoltaic system shown in FIG. 2, after the installation of the photovoltaic system is completed, that is, after the installation of each photovoltaic array is completed, the monitoring unit at each stage determines the actual row position of the photovoltaic unit connected at the back end in the photovoltaic array through question-and-answer and response of communication. Between the communication module and the functional unit as well as between the functional unit and the monitoring unit of the first stage in the photovoltaic array, the actual column position of the photovoltaic unit bound to the monitoring unit at each stage may be determined through switching question and answer and response of communication, and the actual row position of the photovoltaic unit may be known by determining to which functional unit it is connected, thereby realizing the planar physical positioning of each photovoltaic unit in at least one photovoltaic array in the whole photovoltaic system.

In the present application, in the photovoltaic system as shown in FIG. 2, after the communication module acquires the row position, the column position and the corresponding relationship with the serial number of each photovoltaic unit in at least one photovoltaic array, a photovoltaic planar model corresponding to the at least one photovoltaic array may be obtained through modeling, and the photovoltaic planar model includes the identification information of each photovoltaic unit and the position information corresponding to the identification information. The identification information may be the serial number described above or a mark number or serial number set by users according to needs thereof, and the position information may be the row position and the column position described above.

After the photovoltaic planar model is obtained by modeling and a faulty photovoltaic unit is determined subsequently, the position information of the faulty photovoltaic unit in the photovoltaic planar model can be obtained according to the preset identification information of the faulty photovoltaic unit and the preset photovoltaic planar model.

In some embodiments, in the photovoltaic system as shown in FIG. 2, after acquiring the row position, the column position and the corresponding relationship with the serial number of each photovoltaic unit in at least one photovoltaic array, the communication module may convert these information into wireless data (Wi-Fi, Bluetooth, 3/4/ 5G, Sub-1G, etc.) and transmit it to the application terminal, so that the application terminal can obtain the photovoltaic planar model corresponding to at least one photovoltaic array through modeling and display the photovoltaic planar model on the application terminal, wherein the photovoltaic planar model displayed on the application terminal includes a sub-model of each photovoltaic unit in the at least one array and positional relationships of these sub-models.

Figure 4:
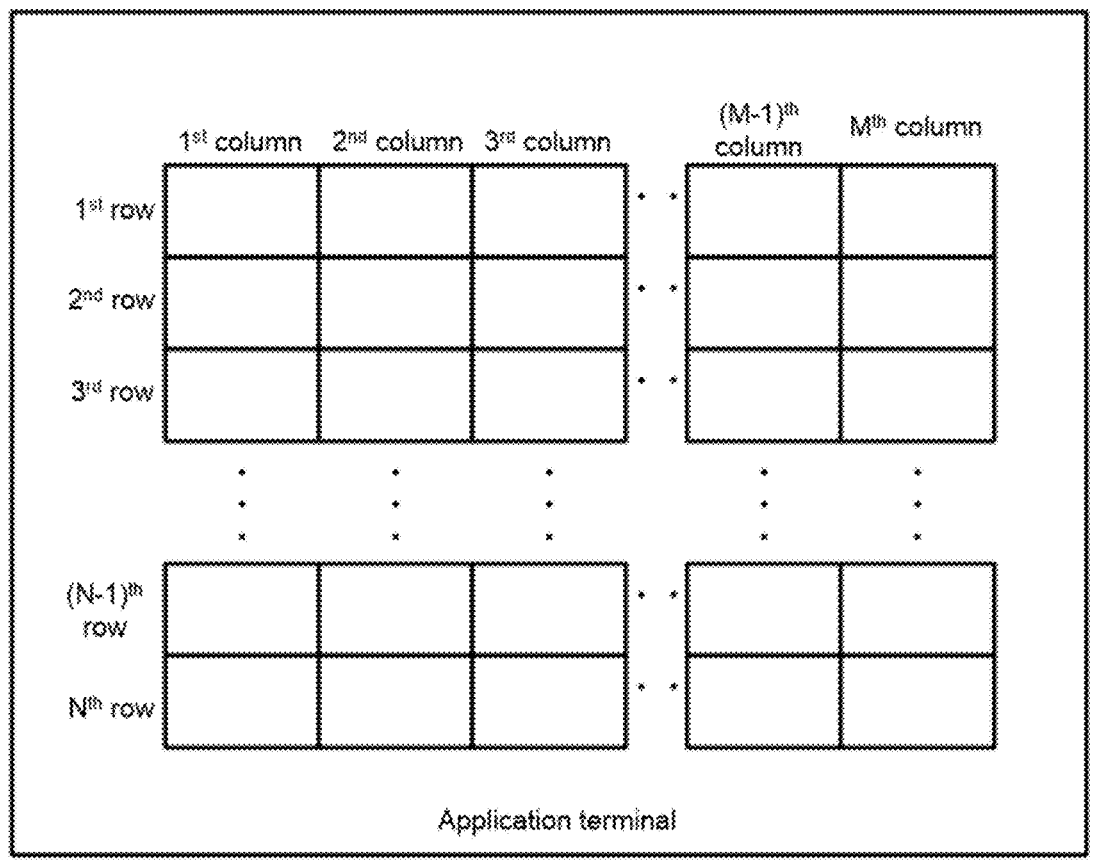
FIG. 4 is a schematic view of a photovoltaic planar model displayed on an application terminal.

FIG. 4 is a schematic view of a photovoltaic planar model displayed on an application terminal. As can be seen from FIG. 4, the photovoltaic planar model is a model of N photovoltaic arrays, and each of the photovoltaic arrays includes M photovoltaic units, so the photovoltaic planar model is a photovoltaic planar model with M rows and N columns.

Through the above modeling process, the identification information of each photovoltaic unit and the position information corresponding to the identification information can be known, so that the position information of the faulty photovoltaic unit in the photovoltaic planar model can be obtained subsequently according to the preset identification information of the faulty photovoltaic unit and the preset photovoltaic planar model.

Further speaking, after the photovoltaic planar model is displayed on the application terminal, the sub-model corresponding to the faulty photovoltaic unit may also be highlighted (for example, marked in red) on the displayed photovoltaic planar model after the position of the faulty photovoltaic unit is subsequently determined, so that the position of the faulty photovoltaic unit in the at least one array can be visually observed.

In order to solve the defects in fault monitoring of the traditional BIPV system, the present application provides a photovoltaic fault monitoring system, which includes: at least one group of photovoltaic arrays, each of the photovoltaic arrays comprising multiple stages of photovoltaic modules connected in series, and each of the stages of photovoltaic modules comprising a photovoltaic unit and a monitoring unit bound with the photovoltaic unit; the monitoring unit being configured to process the received communication signal and output the processed communication signal when the power supply of the bound photovoltaic unit normally supplies power, and directly output the received communication signal when the power supply of the bound photovoltaic unit fails to supply power; a processing module, being connected with the at least one group of photovoltaic arrays, and being configured to acquire the communication signal output by each monitoring unit in the photovoltaic arrays, and determine whether the bound photovoltaic unit is faulty according to the communication signal output by each monitoring unit.

Figure 5:
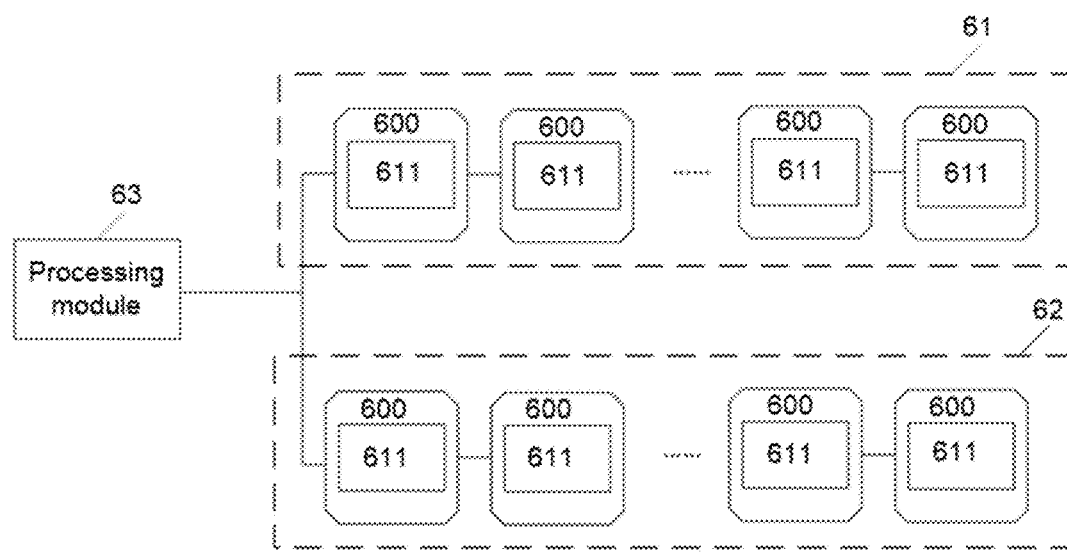
FIG. 5 is a schematic structural diagram of a photovoltaic fault monitoring system.

Illustratively, FIG. 5 is a schematic structural diagram of a photovoltaic fault monitoring system, and FIG. 5 is illustrated by taking the case where the photovoltaic fault monitoring system includes two groups of photovoltaic arrays, namely, a photovoltaic array 61 and a photovoltaic array 62, and includes a processing module 63 as an example. Each photovoltaic array includes multiple stages of photovoltaic modules, and each of the stages of photovoltaic modules includes a photovoltaic unit 600 and a monitoring unit 611 bound to the photovoltaic unit 600.

It shall be noted that, the power supply of the photovoltaic unit, i.e., a photovoltaic cell panel, outputs electric energy, and when a fault occurs to the photovoltaic module, that is, when a fault occurs to the photovoltaic unit, the photovoltaic cell panel cannot work to output electric energy. Therefore, when the power supply of the photovoltaic unit fails to supply power, the received communication signal is directly output, which ensures the normal communication of the series-connected photovoltaic modules while serving as the basis for fault detection of the photovoltaic unit, thereby realizing a low-cost photovoltaic fault monitoring system.

In the photovoltaic fault monitoring system described above, the monitoring unit processes the received communication signal and output the processed communication signal when the power supply of the bound photovoltaic unit normally supplies power, and directly outputs the received communication signal when the power supply of the bound photovoltaic unit fails to supply power, so that the processing module can determine whether the bound photovoltaic unit is faulty according to the communication signal output by each monitoring unit. In this way, which photovoltaic unit is faulty can be determined without providing a detection circuit for detecting the voltage, current, daily power generation capacity and total power generation capacity of the photovoltaic units, and thus fault detection of the photovoltaic unit can be realized at a lower cost.

In some embodiments, the aforesaid monitoring unit in the photovoltaic fault monitoring system may include a conversion unit and a main control unit; the conversion unit is configured to directly output the communication signal when the power supply of the bound photovoltaic unit fails to supply power, and transmit the communication signal to the main control unit when the power supply of the bound photovoltaic unit normally supplies power; and the main control unit is configured to process the received communication signal and output the processed communication signal.

Figure 6:
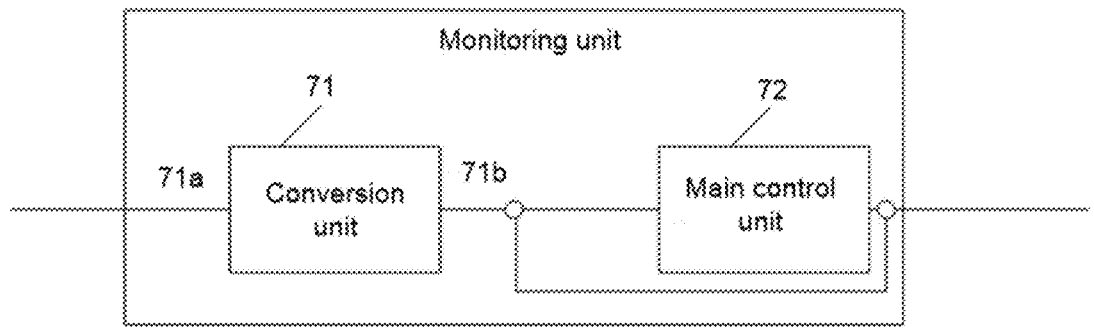
FIG. 6 is a first schematic structural diagram of a monitoring unit.

Illustratively, FIG. 6 is a first schematic structural diagram of a monitoring unit, a conversion unit 71 and a main control unit 72 are shown in FIG. 6, an input terminal of the monitoring unit is connected to an input terminal 71a of the conversion unit 71, an output terminal 71b of the conversion unit 71 is connected to the main control unit 72 and the output terminal of the monitoring unit.

The conversion unit in the aforesaid monitoring unit is configured to directly output the communication signal without being processed through the main control unit when the power supply of the bound photovoltaic unit fails to supply power, and transmit the communication signal to the main control unit when the power supply of the bound photovoltaic unit normally supplies power; the master control unit processes the received communication signal and outputs the processed communication signal. In this scheme, the communication signal output varies depending on whether the communication signal is processed by the master control unit when the power supply of the bound photovoltaic unit fails to supply power or when the power supply of the bound photovoltaic unit normally supplies power, so that the processing module can know whether the power supply of the photovoltaic unit normally supplies power or not simply based on the difference of the communication signals output by the photovoltaic module, thereby determining whether the bound photovoltaic unit is faulty or not.

Figure 7A:
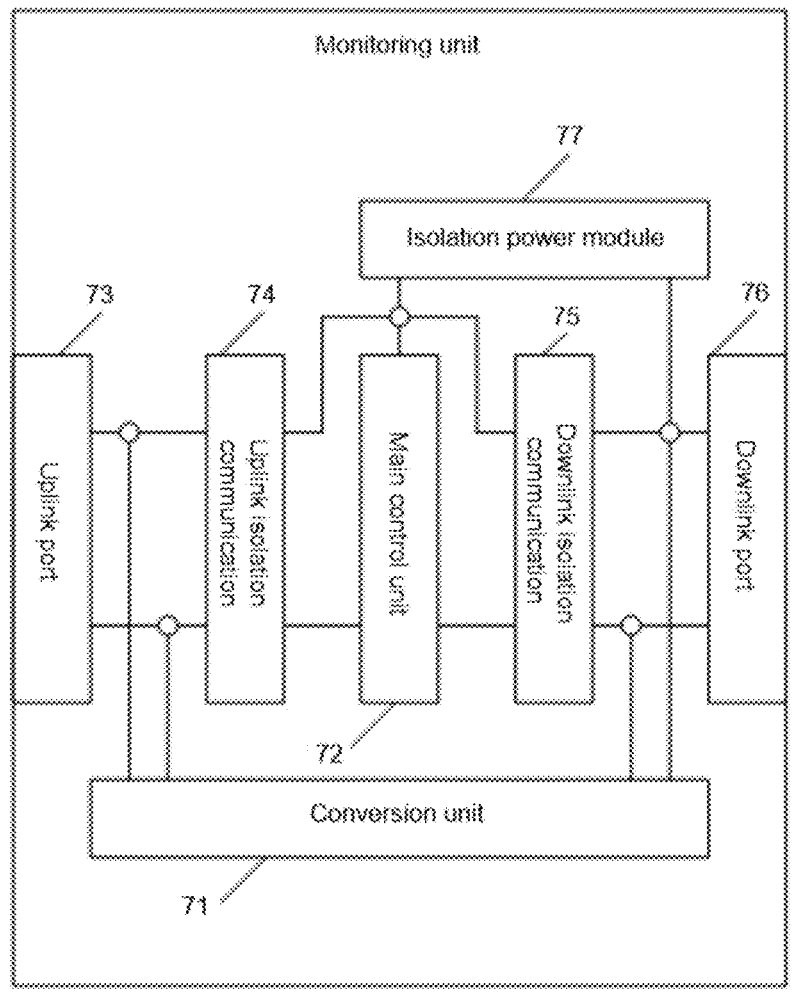
FIG. 7A is a second schematic structural diagram of a monitoring unit.

On the basis of FIG. 6, FIG. 7A is a second schematic structural diagram of a monitoring unit, which includes a conversion unit 71 and a main control unit 72 and also includes an uplink port 73, an uplink isolation communication unit 74, a downlink isolation communication unit 75, a downlink port 76 and an isolation power module 77 as shown in FIG. 7A.

The uplink port 73 is used to receive the communication signal that is input, the uplink isolation communication unit 74 is used to isolate signals transmitted and received by the uplink port 73, the downlink isolation communication unit 75 is used to isolate signals transmitted and received by the downlink port 76, and the isolation power module 77 is used to be connected with the power supply of photovoltaic unit.

In some embodiments, each monitoring unit includes a conversion unit and a main control unit, and each monitoring unit further includes: an uplink port, being connected with the monitoring unit of the previous stage; a downlink port, being connected with the monitoring unit of the next stage; the conversion unit includes a first relay, the first relay is connected with the power supply of the bound photovoltaic unit, the uplink port, the downlink port and the main control unit; when the power supply of the bound photovoltaic unit normally supplies power, the first relay is configured to control the uplink port to be connected to the main control unit so as to transmit the communication signal received by the uplink port to the main control unit to be processed and then output to the downlink port; and when the power supply of the bound photovoltaic unit fails to supply power, the first relay is configured to control the uplink port to be connected to the downlink port so as to directly output the communication signal received by the uplink port to the downlink port.

Figure 7B:
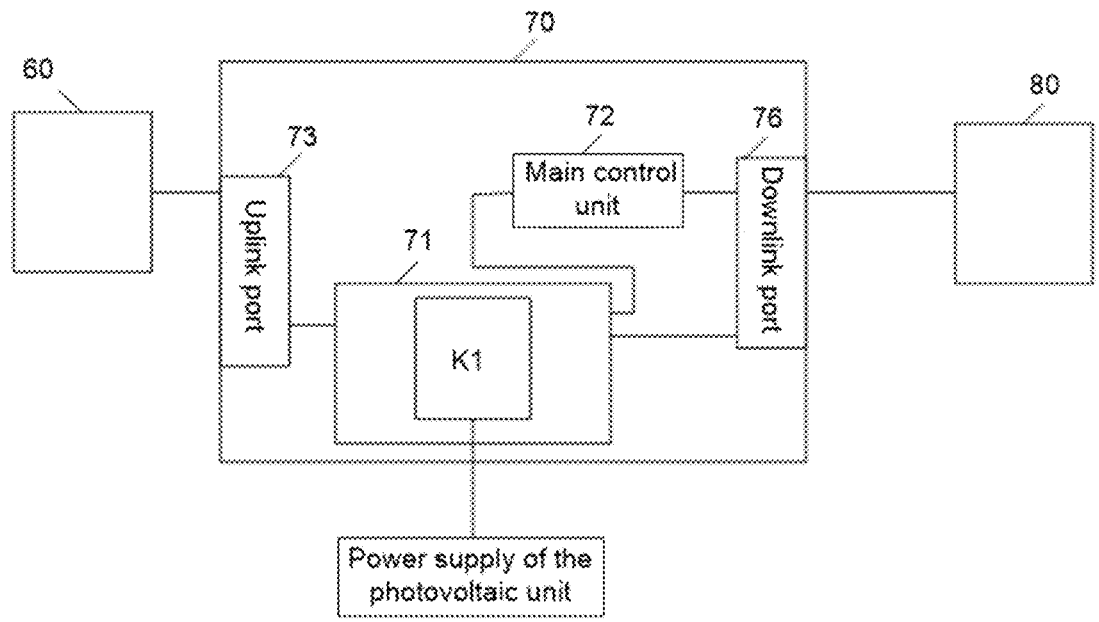
FIG. 7B is a third schematic structural diagram of a monitoring unit.

Illustratively, on the basis of FIG. 6, FIG. 7B is a third schematic structural diagram of a monitoring unit, which includes a conversion unit 71, a main control unit 72 and also includes an uplink port 73 and a downlink port 76, and the conversion unit 71 includes a first relay K1. In FIG. 7B, the monitoring unit at this stage is represented as a monitoring unit 70, the monitoring unit of the previous stage is represented as a monitoring unit 60, and the monitoring unit of the next stage is represented as a monitoring unit 80. As can be seen from FIG. 7B, the uplink port 73 in the monitoring unit 70 is connected to the monitoring unit 60 of the previous stage, the downlink port 76 is connected to the monitoring unit 80 of the next stage, and the first relay K1 is connected to the power supply of the bound photovoltaic unit, the uplink port 73, the downlink port 76 and the main control unit 72.

Figure 8:
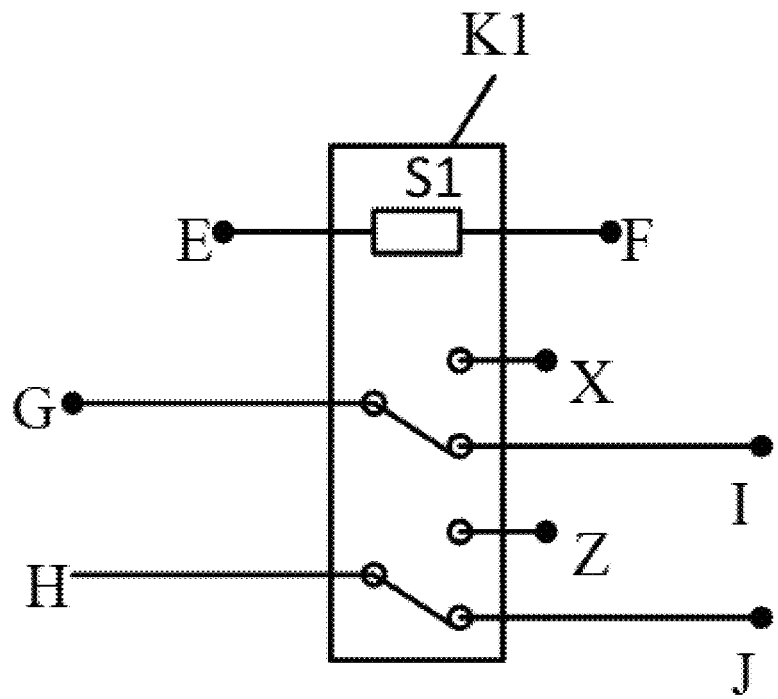
FIG. 8 is a schematic view of a first relay.

Illustratively, FIG. 8 is a schematic view of a first relay, and a first coil S1 in the first relay K1 is connected to the power supply of the bound photovoltaic unit. That is, a point E in FIG. 8 is connected to the negative pole of the power supply of the bound photovoltaic unit, a point F is connected to the positive pole of the power supply of the bound photovoltaic unit, a first input terminal G of the first relay K1 is connected to a transmitting port of the uplink port, a second input terminal H of the first relay K1 is connected to a receiving port of the uplink port, a first output terminal X and a second output terminal Z of the first relay K1 are connected to the main control unit, a third output terminal I of the first relay K1 is connected to a transmitting port of the downlink port, and a fourth output terminal J of the first relay K1 is connected to a receiving port of the downlink port.

In the monitoring unit described above, the conversion unit mainly controls through the first relay to directly output the communication signal without being processed through the main control unit when the power supply of the bound photovoltaic unit fails to supply power, and transmit the communication signal to the main control unit when the power supply of the bound photovoltaic unit normally supplies power; the master control unit processes the received communication signal and outputs the processed communication signal. In this way, the processing module can know whether the power supply of the photovoltaic unit normally supplies power or not simply based on the difference of the communication signals that are output, thereby determining whether the bound photovoltaic unit is faulty or not.

In some embodiments, the conversion unit includes a first relay and a second relay.

Figure 9:
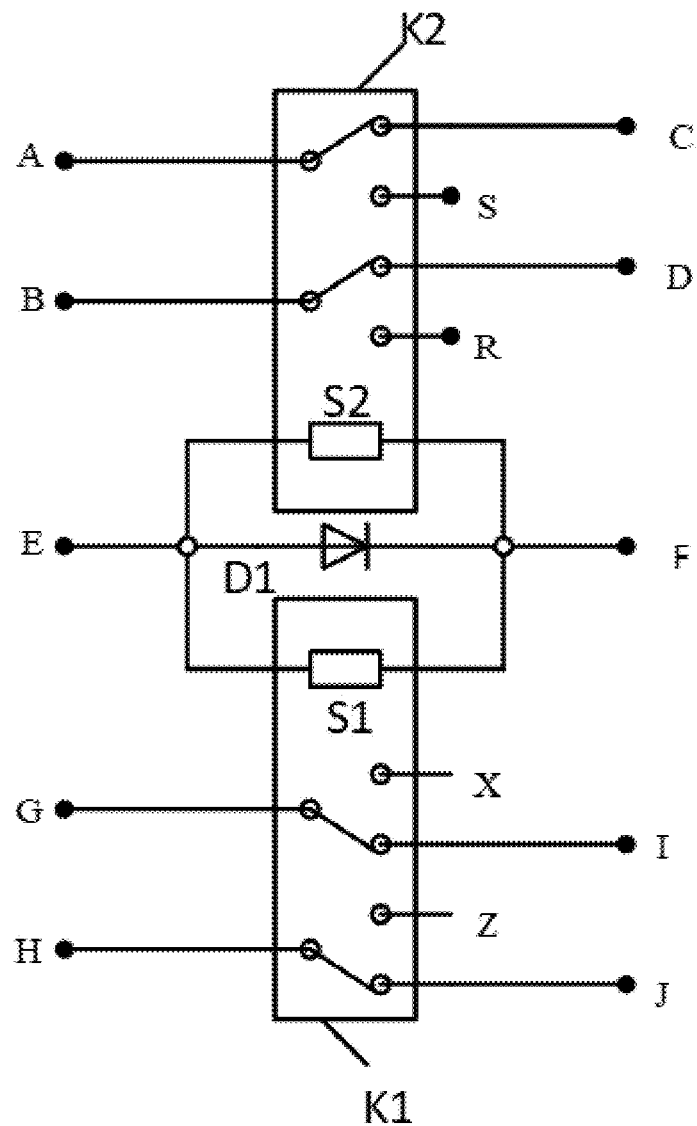
FIG. 9 is a schematic structural diagram of a conversion unit.

FIG. 9 is a schematic structural diagram of a conversion unit, which includes the aforesaid first relay K1 and a second relay K2, and a coil S2 in the figure is the coil in the second relay. In FIG. 9, a point E is connected to the negative pole of the power supply of the bound photovoltaic unit, a point F is connected to the positive pole of the power supply of the bound photovoltaic unit, the first input terminal G of the first relay K1 is connected to the transmitting port of the uplink port, the second input terminal H of the first relay K1 is connected to the receiving port of the uplink port, the first output terminal X and the second output terminal Z of the first relay K1 are connected to the main control unit, the third output terminal I of the first relay K1 is connected to the transmitting port of the downlink port, and the fourth output point J of the first relay K1 is connected to the receiving port of the downlink port.

The second relay K2 is connected with the power supply of the bound photovoltaic unit, that is, at both ends of the second coil S2 in the second relay K2 in FIG. 9, a point E is connected with the negative pole of the power supply of the bound photovoltaic unit, and a point F is connected with the positive pole of the power supply of the bound photovoltaic unit. The second relay K2 is connected to the power supply of the photovoltaic unit of the previous stage, in FIG. 9, a point A is connected to the positive pole of the power supply of the photovoltaic unit at the previous stage and a point C in the monitoring unit to which the photovoltaic unit of previous stage is bound (i.e., the monitoring unit of the previous stage), and a point B is connected to the negative pole of the power supply of the photovoltaic unit at the previous stage and a point D in the monitoring unit to which the photovoltaic unit of the previous stage is bound (i.e., the monitoring unit of the previous stage). The second relay K2 is further connected to the photovoltaic unit of the next stage, that is, a point C in FIG. 9 is connected to a point A of the photovoltaic unit of the next stage; and a point D is connected to a point B of the photovoltaic unit of the next stage. For the second relay K2 described above, the second relay K2 may be used to control the power supply of the photovoltaic unit of the previous stage to be connected to the common contact, i.e., points S and R as shown in FIG. 9, when the power supply of the bound photovoltaic unit normally supplies power; and the second relay is used to control the power supply of the photovoltaic unit of the previous stage to be connected to the photovoltaic unit of the next stage when the power supply of the bound photovoltaic unit fails to supply power.

Optionally, a diode D1 may be included in FIG. 9.

Figure 10:
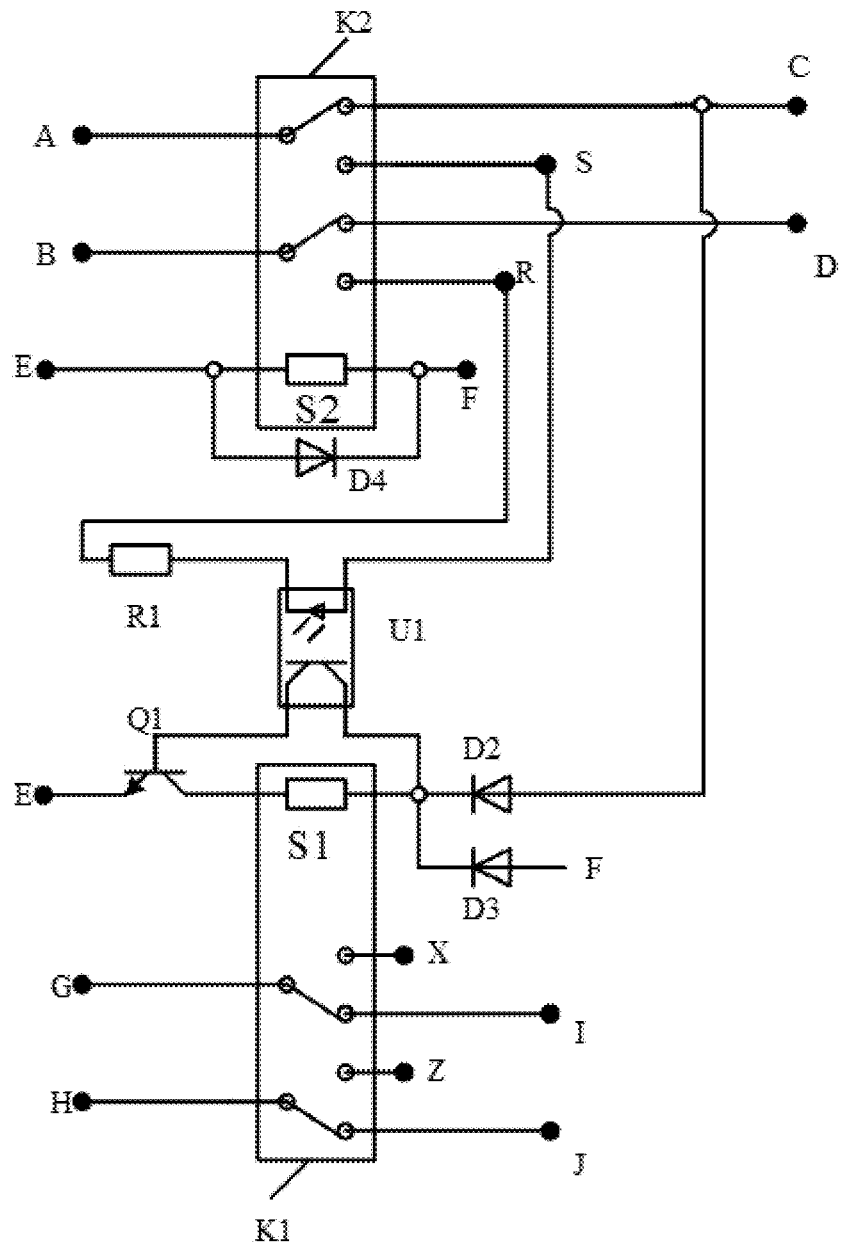
FIG. 10 is a schematic structural diagram of another conversion unit.

FIG. 10 is a schematic structural diagram of another conversion unit, which includes the aforesaid first relay K1 and second relay K2, a switching transistor Q1 and an optical coupler U1.

Points A, B, C, D, E, F, G, H, X, Z, I, J, S and R in FIG. 10 are the same as those in FIG. 9, and thus will not be further described herein. An input terminal of the switching transistor Q1 is connected to a second terminal of the first coil S1, and an output terminal of the switching transistor Q1 is connected to the negative pole of the bound photovoltaic unit (that is, the point E). The optical coupler U1 is configured to control the switching transistor Q1 to be in a turned-on state so that the first coil S1 is powered on when the power supply of the bound photovoltaic unit normally supplies power; and the optical coupler U1 is configured to control the switching transistor Q1 to be in a turned-off state so that the first coil S1 is powered off when the power supply of the bound photovoltaic unit fails to supply power.

Optionally, FIG. 10 may further include a diode D2, a diode D3, a diode D4 and a resistor R1.

Taking FIG. 10 as an example, the working principle of the aforesaid conversion unit is as follows: when a fault occurs to the photovoltaic power supply and the photovoltaic power supply operates abnormally, the power supply of the photovoltaic unit fails to supply power, and at this point, the first coil S1 of the first relay K1 is powered off, and the common contact of the first relay K1 is controlled to be connected with the normally closed contact, that is, the point A is connected with the point C, and the point B is connected with the point D. At this point, the point S and the point R are suspended, and the input terminal of the optical coupler U1 is out of power so that Q1 is in a disconnected state. That is, the loop of the second coil S2 of the second relay K2 is disconnected, and a common contact of the second relay K2 is connected with the normally closed contact, that is, the point G is connected with the point I, and the point H is connected with the point J. That is, the uplink port is connected with the downlink port, and the communication signal received from the uplink port is directly sent to the downlink port, thereby bypassing the communication line of the photovoltaic unit.

Figure 11:
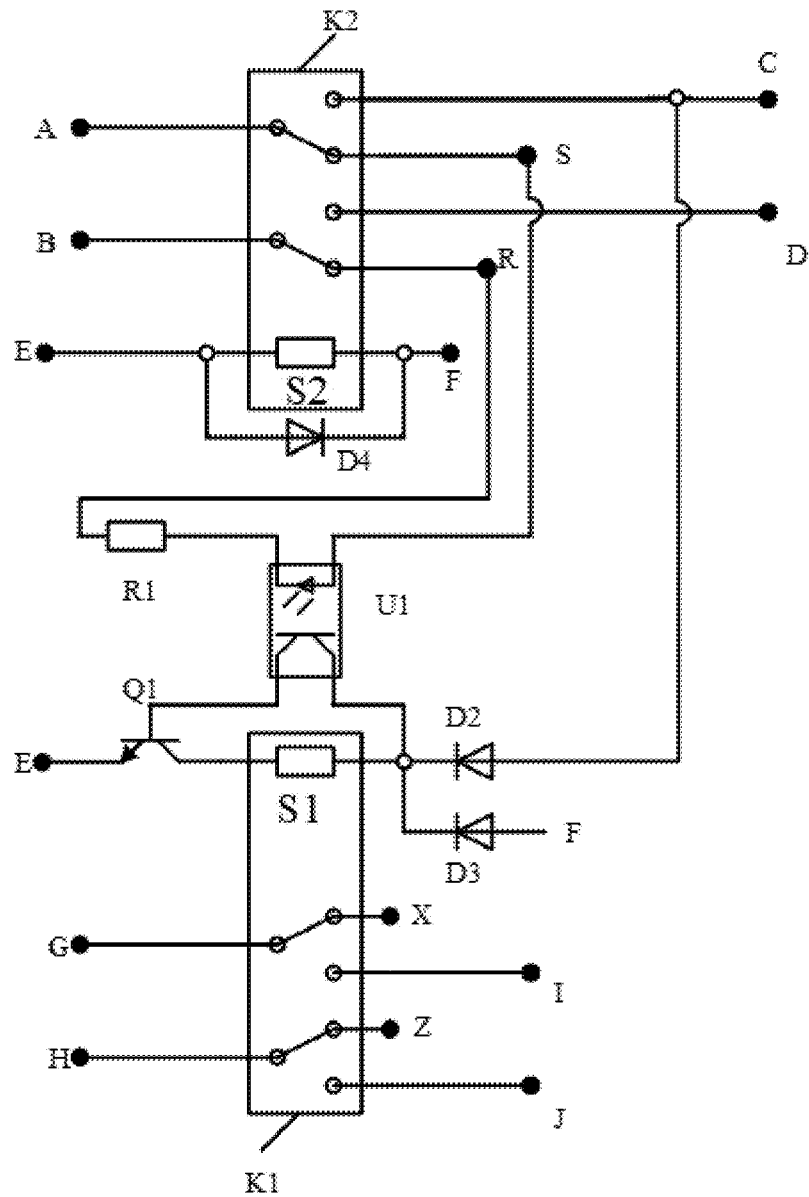
FIG. 11 is a schematic structural diagram of yet another conversion unit.

Taking FIG. 11 as an example, FIG. 11 is a schematic structural diagram of yet another conversion unit and shows connection relationships when the photovoltaic power supply in FIG. 10 is changed into normal operation. The working principle of the aforesaid conversion unit is as follows: when the photovoltaic power supply works normally, that is, the power supply of the photovoltaic unit is capable of supplying power, the first coil S1 of the first relay K1 is powered on, and the normally open contact controlling the switch of the first relay K1 is connected with the common contact, that is, the point A is connected with the point S, and the point B is connected with the point R. In addition, because the input terminal of the optical coupler U1 receives the electric energy from the power supply of the previous stage, the output terminal of the optical coupler U1 is connected so that Q1 is controlled to be turned on and then the second coil of the second relay K2 is powered on, the point G is controlled to be connected with the point X, and the point H is controlled to be connected with the point Z.

Because the point X and the point Z are connected to the input terminal of the main control unit, the communication signal received from the uplink port may be sent to the main control unit to be processed so that the photovoltaic unit outputs the processed communication signal.

Figure 12:
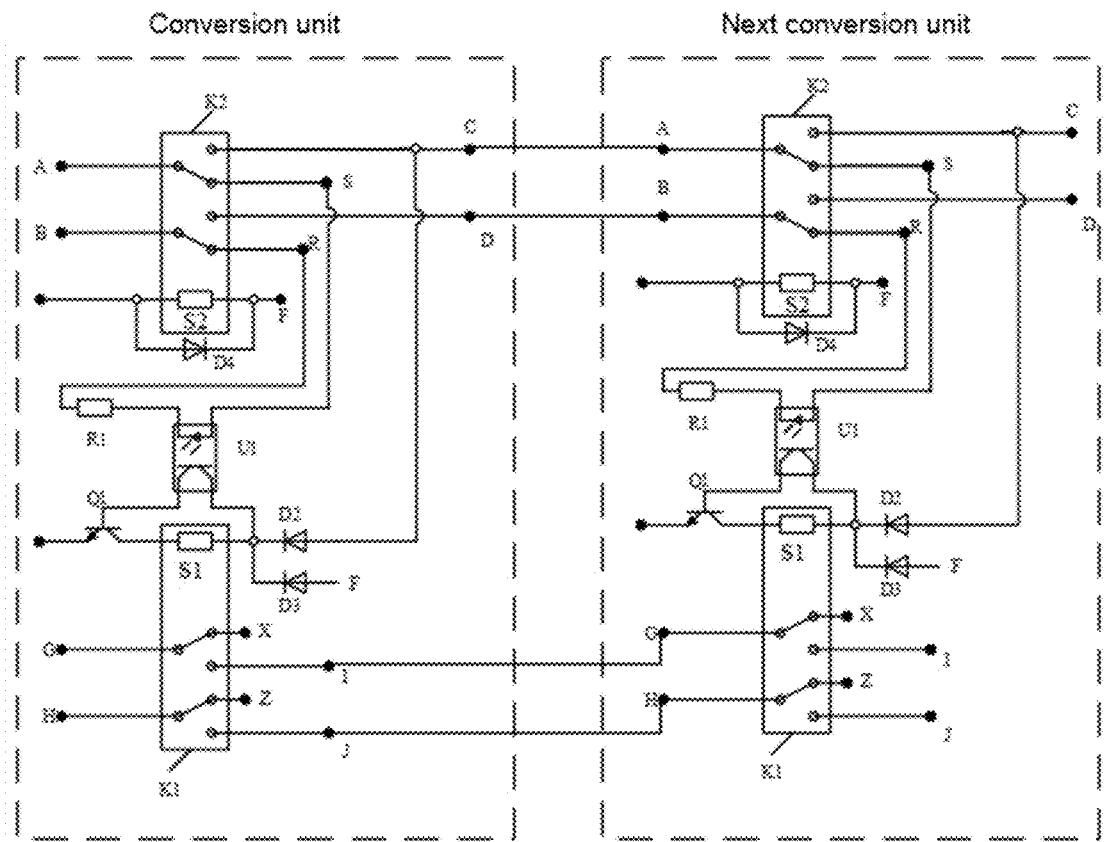
FIG. 12 is a schematic view illustrating the connection of a two-stage conversion unit by taking the conversion unit shown in FIG. 10 as an example.

In order to facilitate the appreciation of the connection of two adjacent stages of conversion units when multiple stages of photovoltaic modules are connected, the present application provides a schematic view illustrating the connection of two-stage conversion units, and FIG. 12 is a schematic view illustrating the connection of two-stage conversion units by taking the conversion unit shown in FIG. 10 as an example.

In some embodiments, the processing module 63 in the photovoltaic fault monitoring system shown in FIG. 5 is specifically configured to: determine that the bound photovoltaic unit is faulty and output fault information if it is detected that communication signals output by a monitoring unit within a first preset duration are all unprocessed communication signals.

Based on the fact that photovoltaic units need a long time to generate electric energy when the solar energy is insufficient on cloudy and rainy days, or some of the photovoltaic units generate electric energy intermittently, a first preset duration may be set, and it is detected whether signals output within the first preset duration are all unprocessed communication signals. If it is determined that signals output within a relatively long period of time (that is, within the first preset duration) are all unprocessed communication signals, then it may be determined that the communication signals output by the monitoring unit are all unprocessed communication signals because the photovoltaic unit is faulty, thereby improving the accuracy of detection.

In some embodiments, the processing module 63 in the photovoltaic fault monitoring system shown in FIG. 5 is specifically configured to: determine that the bound photovoltaic unit is faulty and output fault information if it is detected that communication signals output by a monitoring unit within a preset period of time are all unprocessed communication signals.

Because the photovoltaic units do not generate electric energy at night or in the afternoon on cloudy and rainy days, a preset period of time (for example, during the day) may be set, and it is only detected whether the communication signals output within the preset period of time are unprocessed signals. If it is determined that the communication signals output within the preset duration (i.e., the first preset duration) are all unprocessed communication signals, then it may be determined that the communication signals output by the monitoring unit are all unprocessed communication signals because the photovoltaic unit is faulty, thereby improving the accuracy of detection.

In some embodiments, the processing module 63 in the photovoltaic fault monitoring system shown in FIG. 5 is specifically configured to: determine that the bound photovoltaic unit is faulty and output fault information if it is detected that communication signals output by a monitoring unit within a first preset duration of the preset period of time are all unprocessed communication signals.

Providing both the preset period of time and the first preset duration may further improve the accuracy of detection.

In some embodiments, the first preset duration and/or the preset period of time are set based on the current weather information, so that appropriate first preset duration and/or preset period of time can be set in combination with the relationships between the current weather information and the available solar energy.

In some embodiments, the processing module 63 in the photovoltaic fault monitoring system shown in FIG. 5 is further configured to acquire preset identification information in a faulty photovoltaic unit, and acquire position information of the faulty photovoltaic unit according to the identification information and a preset photovoltaic planar model corresponding to at least one group of photovoltaic arrays. The photovoltaic planar model includes the identification information of each photovoltaic unit and the position information corresponding to the identification information.

The preset identification information in the faulty photovoltaic unit may be the serial number of the faulty photovoltaic unit. The position information of the faulty photovoltaic unit may be the row position and the column position of the faulty photovoltaic unit in the photovoltaic system.

According to the photovoltaic fault monitoring system provided in the above embodiment, the position information of the faulty photovoltaic unit in the photovoltaic system can be obtained through the preset identification information of the faulty photovoltaic unit and the photovoltaic planar model, so that the position information of the faulty photovoltaic unit can be determined after the faulty photovoltaic unit is determined, thereby facilitating the timely processing of the faulty photovoltaic unit.

Figure 13:
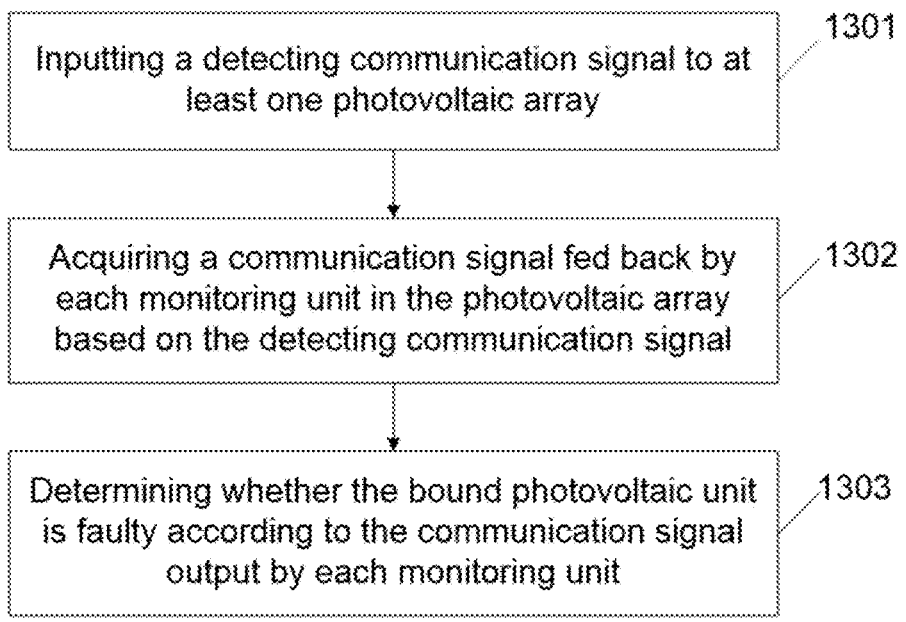
FIG. 13 is a first flowchart diagram of a photovoltaic fault monitoring method.

An embodiment of the present application provides a photovoltaic fault monitoring method, FIG. 13 is a first flowchart diagram of a photovoltaic fault monitoring method which is for use in the photovoltaic fault monitoring system in the above embodiment, and the method may include but not limited to the following steps:

1301. inputting a detecting communication signal to at least one photovoltaic array.

The detecting communication signal is a communication signal used for detecting whether a photovoltaic unit in the at least one photovoltaic array is faulty.

The above detecting communication signal may be input to each monitoring unit, and the above detecting communication signal may also be input to the monitoring unit in the photovoltaic module of the first stage in each photovoltaic array, and stage-by-stage communication transmission is performed by the monitoring units in the multiple stages of photovoltaic module in the photovoltaic array.

1302. acquiring a communication signal fed back by each monitoring unit in the photovoltaic array based on the detecting communication signal.

Based on the photovoltaic fault monitoring system in the above embodiment, the monitoring unit processes the detecting communication signal and outputs the processed communication signal when no fault occurs to the photovoltaic unit, and the monitoring unit directly outputs the detecting communication signal without processing when no fault occurs to the photovoltaic unit.

1303. determining whether the bound photovoltaic unit is faulty according to the communication signal output by each monitoring unit.

Whether the bound photovoltaic unit is faulty can be determined according to the communication signal output by each monitoring unit.

In some embodiments, if it is detected that the communication signals output by a monitoring unit within a first preset duration are all unprocessed communication signals, then the bound photovoltaic unit is determined to be faulty and fault information is output.

Based on the fact that photovoltaic units need a long time to generate electric energy when the solar energy is insufficient on cloudy and rainy days, or some of the photovoltaic units generate electric energy intermittently, a first preset duration may be set, and it is detected whether signals output within the first preset duration are all unprocessed communication signals. If it is determined that signals output within a relatively long period of time (that is, within the first preset duration) are all unprocessed communication signals, then it may be determined that the communication signals output by the monitoring unit are all unprocessed communication signals because the photovoltaic unit is faulty, thereby improving the accuracy of detection.

In some embodiments, if it is detected that the communication signals output by a monitoring unit within a preset period of time are all unprocessed communication signals, then the bound photovoltaic unit is determined to be faulty and fault information is output.

Because the photovoltaic units do not generate electric energy at night or in the afternoon on cloudy and rainy days, a preset period of time (for example, during the day) may be set, and it is only detected whether the communication signals output within the preset duration are unprocessed signals. If it is determined that the communication signals output within the preset period of time (i.e., the first preset duration) are all unprocessed communication signals, then it may be determined that the communication signals output by the monitoring unit are all unprocessed communication signals because the photovoltaic unit is faulty, thereby improving the accuracy of detection.

In some embodiments, if it is detected that the communication signals output by a monitoring unit within a first preset duration of a preset period of time are all unprocessed communication signals, then the bound photovoltaic unit is determined to be faulty and fault information is output.

Providing both the preset period of time and the first preset duration may further improve the accuracy of detection.

In some embodiments, the first preset duration and/or the preset period of time are set based on the current weather information, so that appropriate first preset duration and/or preset period of time can be set in combination with the relationships between the current weather information and the available solar energy.

According to the photovoltaic fault monitoring method described above, whether the bound photovoltaic unit is faulty may be determined according to the communication signal output by each monitoring unit based on the detecting communication signal, and which photovoltaic unit is faulty can be determined without providing a detection circuit for detecting the voltage, current, daily power generation capacity and total power generation capacity of the photovoltaic units, and thus fault detection of the photovoltaic unit can be realized at a lower cost.

Figure 14:
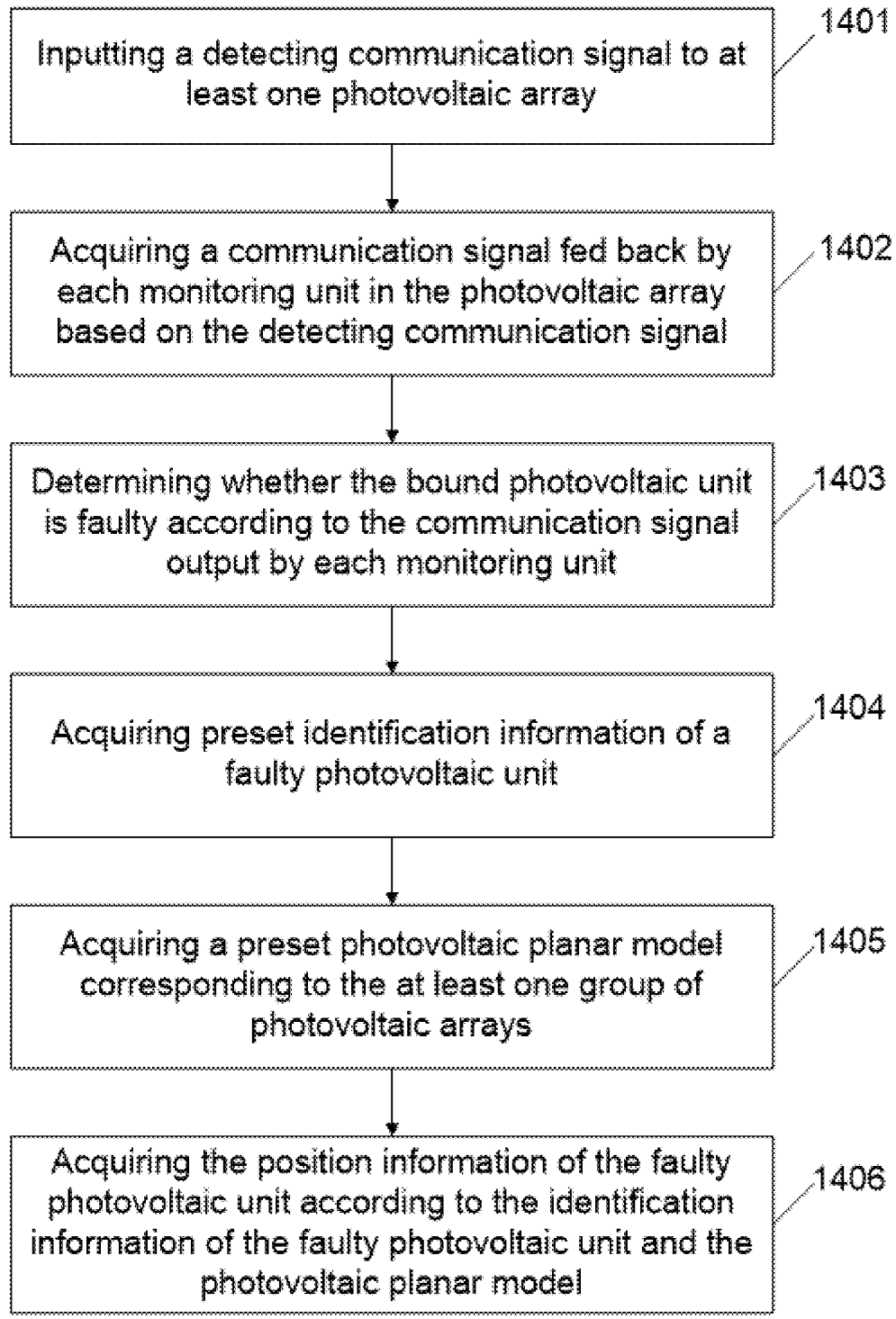
FIG. 14 is a second flowchart diagram of a photovoltaic fault monitoring method.

An embodiment of the present application provides a photovoltaic fault monitoring method, FIG. 14 is a second flowchart diagram of a photovoltaic fault monitoring method which is for use in the photovoltaic fault monitoring system in the above embodiment, and the method may include but not limited to the following steps:

1401. inputting a detecting communication signal to at least one photovoltaic array.

In some embodiments, before the detecting communication signal is input to the at least one photovoltaic array, the identification of the bound photovoltaic unit and position information in the photovoltaic array where the bound photovoltaic unit is located which are sent by each monitoring unit in the at least one photovoltaic array can be received at first; and performing modeling on the at least one photovoltaic array to obtain the photovoltaic planar model based on the identification of the bound photovoltaic unit and the position information in the photovoltaic array where the bound photovoltaic unit is located which are sent by each monitoring unit.

1402. acquiring a communication signal fed back by each monitoring unit in the photovoltaic array based on the detecting communication signal.

1403. determining whether the bound photovoltaic unit is faulty according to the communication signal output by each monitoring unit.

For the description of the above steps 1401 to 1403, reference may be made to the above description of the steps 1301 to 1303, and this will not be further described herein.

1404. acquiring preset identification information of a faulty photovoltaic unit.

Acquiring the preset identification information of the faulty photovoltaic unit may be receiving the identification information of the faulty photovoltaic unit sent by the faulty photovoltaic unit.

1405. acquiring a preset photovoltaic planar model corresponding to the at least one group of photovoltaic arrays.

The photovoltaic planar model may be a model generated for the at least one group of photovoltaic arrays saved in advance, and the specific model generation process may be realized based on the automatic planar modeling method of the photovoltaic system in the above embodiment.

1406. acquiring the position information of the faulty photovoltaic unit according to the identification information of the faulty photovoltaic unit and the photovoltaic planar model.

The photovoltaic planar model contains identification information of each photovoltaic unit and position information corresponding to the identification information.

Because the photovoltaic planar model contains the identification information of each photovoltaic unit and the location information corresponding to the identification information, the location information of the faulty photovoltaic unit can be obtained from the photovoltaic planar model based on the identification information of the faulty photovoltaic unit, so that the position of the faulty photovoltaic unit can be accurately determined.

In the present application, the application terminal may display the photovoltaic planar model by using the identification information of each photovoltaic unit and the position information corresponding to the identification information, and the photovoltaic planar model displayed on the application terminal includes the sub-models of each photovoltaic unit in the at least one array and the position relationships of these sub-models. Further speaking, after the photovoltaic planar model is displayed on the application terminal, the sub-model corresponding to the faulty photovoltaic unit may be highlighted (for example, marked in red) on the displayed photovoltaic planar model after the position of the faulty photovoltaic unit is subsequently determined, so that the position of the faulty photovoltaic unit in at least one array can be visually observed and the human-computer interaction performance can be improved.

As shall be appreciated, although the steps in the flowchart involved in the above embodiments are displayed in sequence as indicated by arrows, these steps are not necessarily executed in the sequence indicated by the arrows. Unless explicitly stated herein, the execution of these steps is not strictly limited in order, and these steps may be executed in other orders. Moreover, at least a part of the steps in the flowchart involved in the above embodiments may include multiple steps or multiple stages, which are necessarily be completed at the same time but may be executed at different times, and these steps or stages are not necessarily executed in sequence but may be alternately or alternatively executed with other steps or at least a part of steps or stages in other steps.

In one embodiment, a computer-readable storage medium having a computer program stored thereon is provided, and the computer program, when executed by a processor, implements the following steps:

inputting a detecting communication signal to the at least one photovoltaic array;

acquiring a communication signal fed back by each monitoring unit in the photovoltaic array based on the detecting communication signal;

determining whether the bound photovoltaic unit is faulty according to the communication signal output by each monitoring unit.

In one embodiment, the computer program, when executed by the processor, further implements the following steps:

acquiring preset identification information of a faulty photovoltaic unit;

acquiring a preset photovoltaic planar model corresponding to the at least one group of photovoltaic arrays;

acquiring the position information of the faulty photovoltaic unit according to the identification information and the photovoltaic planar model, wherein the photovoltaic planar model contains identification information of each of the photovoltaic units and position information corresponding to the identification information.

In one embodiment, the computer program, when executed by the processor, further implements the following steps: before inputting the detecting communication signal to the at least one photovoltaic array, receiving identification of the bound photovoltaic unit and position information in the photovoltaic array where the bound photovoltaic unit is located which are sent by each monitoring unit in the at least one photovoltaic array; performing modeling on the at least one photovoltaic array to obtain the photovoltaic planar model based on the identification of the bound photovoltaic unit and position information in the photovoltaic array where the bound photovoltaic unit is located which are sent by each monitoring unit.

In one embodiment, the computer program, when executed by the processor, further implements the following steps: the operation of determining whether the bound photovoltaic unit is faulty according to the communication signal output by each monitoring unit includes: determining that the bound photovoltaic unit is faulty and outputting fault information if it is detected that communication signals output by one of the monitoring units within a first preset duration are all unprocessed communication signals; and/or determining that the bound photovoltaic unit is faulty and outputting the fault information if it is detected that communication signals output by one of the monitoring units within a preset period of time are all unprocessed communication signals.

In one embodiment, a computer program product comprising a computer program is provided, and the computer program, when executed by a processor, implements the following steps: inputting a detecting communication signal to the at least one photovoltaic array; acquiring a communication signal fed back by each monitoring unit in the photovoltaic array based on the detecting communication signal; determining whether the bound photovoltaic unit is faulty according to the communication signal output by each monitoring unit.

In one embodiment, the computer program, when executed by the processor, further implements the following steps: acquiring preset identification information of a faulty photovoltaic unit; acquiring a preset photovoltaic planar model corresponding to the at least one group of photovoltaic arrays; acquiring the position information of the faulty photovoltaic unit according to the identification information and the photovoltaic planar model, wherein the photovoltaic planar model contains identification information of each of the photovoltaic units and position information corresponding to the identification information.

In one embodiment, the computer program, when executed by the processor, further implements the following steps: before inputting the detecting communication signal to the at least one photovoltaic array, receiving identification of the bound photovoltaic unit and position information in the photovoltaic array where the bound photovoltaic unit is located which are sent by each monitoring unit in the at least one photovoltaic array; performing modeling on the at least one photovoltaic array to obtain the photovoltaic planar model based on the identification of the bound photovoltaic unit and position information in the photovoltaic array where the bound photovoltaic unit is located which are sent by each monitoring unit.

In one embodiment, the computer program, when executed by the processor, further implements the following steps: the operation of determining whether the bound photovoltaic unit is faulty according to the communication signal output by each monitoring unit includes: determining that the bound photovoltaic unit is faulty and outputting fault information if it is detected that communication signals output by one of the monitoring units within a first preset duration are all unprocessed communication signals; and/or determining that the bound photovoltaic unit is faulty and outputting the fault information if it is detected that communication signals output by one of the monitoring units within a preset period of time are all unprocessed communication signals.

It shall be noted that the user information (including but not limited to user equipment information, user personal information, etc.) and data (including but not limited to data for analysis, stored data, displayed data, etc.) involved in the present application are all information and data authorized by users or fully authorized by all parties, and the collection, use and processing of relevant data must comply with relevant regulations.

As shall be appreciated by those of ordinary skill in the art, all or part of the flow processes in the method of the aforesaid embodiments may be achieved by instructing related hardware through a computer program, the computer program may be stored in a nonvolatile computer-readable storage medium, and when executed, the computer program may include the flow processes of the embodiments of the method as described above. Any reference to memory, database or other media used in various embodiments provided according to the present application may include at least one of non-volatile and volatile memories. The non-volatile memory may include Read-Only Memory (ROM), magnetic tape, floppy disk, flash memory, optical memory, high-density embedded nonvolatile memory, Resistive Random Access Memory (ReRAM), Magnetoresistive Random Access Memory (MRAM), Ferroelectric Random Access Memory (FRAM), Phase Change Memory (PCM), Graphene Memory or the like. The volatile memory may include Random Access Memory (RAM) or external cache memory or the like. By way of illustration and not limitation, RAM may be in various forms, such as a Static Random Access Memory (SRAM) or a Dynamic Random Access Memory (DRAM) or the like. The databases involved in various embodiments provided according to the present application may include at least one of relational databases and non-relational databases. The non-relational databases may include, but are not limited to, distributed databases based on blockchain. The processors involved in various embodiments provided according to the present application may be general processors, central processing units, graphics processing units, digital signal processors, programmable logical devices, and data processing logical devices based on quantum computing or the like, without being limited thereto.

The technical features of the above embodiments may be combined arbitrarily, and in order to simplify the description, not all possible combinations of technical features at various levels in the above embodiments are described. However, the combinations of these technical features shall be considered as within the scope described in this specification as long as there is no contradiction therebetween.

The aforesaid embodiments only represent several implementations of the present application, and although these embodiments are described specifically and in detail, they should not be construed as limitation to the patent scope of the present application. It shall be noted that, for those of ordinary skill in the art, several modifications and improvements can be made without departing from the concept of the present application, and all these modifications and improvements are within the scope claimed in the present application. Therefore, the scope claimed in the patent of the present application shall be governed by the appended claims.

The invention claimed is:

1. A photovoltaic fault monitoring system, comprising:
at least one group of photovoltaic arrays, each of the photovoltaic arrays comprising multiple stages of photovoltaic modules connected in series, and each of the stages of photovoltaic modules comprising a photovoltaic unit and a monitoring unit bound with the photovoltaic unit;
a processing module, being connected with the at least one group of photovoltaic arrays, and being configured to acquire the communication signal output by each monitoring unit in the photovoltaic arrays, and determine whether the bound photovoltaic unit is faulty by determining whether the photovoltaic unit normally supplies power according to the communication signal output by each monitoring unit;
wherein the monitoring unit comprises a conversion unit, a main control unit, an uplink port and a downlink port;
the conversion unit is configured to directly output the received communication signal when a power supply of the bound photovoltaic unit fails to supply power, and transmit the received communication signal to the main control unit when the power supply of the bound photovoltaic unit normally supplies power; and
the main control unit is configured to process the received communication signal and output the processed communication signal;
the uplink port is connected with the monitoring unit of the photovoltaic modules of a previous stage;
the downlink port is connected with the monitoring unit of the photovoltaic modules of a next stage;
wherein the conversion unit comprises a first relay, a second relay, a switching transistor and an optical coupler;
wherein a first coil in the first relay is connected to the power supply of the bound photovoltaic unit; a first input terminal of the first relay is connected to a transmitting port of the uplink port, a second input terminal of the first relay is connected to a receiving port of the uplink port, a first output terminal and a second output terminal of the first relay are connected to the main control unit, a third output terminal of the first relay is connected to a transmitting port of the downlink port, and a fourth output terminal of the first relay is connected to a receiving port of the downlink port;
the second relay is connected with the power supply of the photovoltaic unit of the previous stage, the power supply of the bound photovoltaic unit and the photovoltaic unit of the next stage;
the optical coupler is connected with the second relay, the switching transistor and the first coil, the switching transistor is connected with the first coil;
wherein when the power supply of the bound photovoltaic unit normally supplies power, the first relay is configured to control the uplink port to be connected to the main control unit so as to transmit the communication signal received by the uplink port to the main control unit; and when the power supply of the bound photovoltaic unit fails to supply power, the first relay is configured to control the uplink port to be connected to the downlink port so as to directly output the communication signal received by the uplink port to the downlink port;
when the power supply of the bound photovoltaic unit normally supplies power, the second relay is configured to control the power supply of the photovoltaic unit of the previous stage to be connected to a common contact; and when the power supply of the bound photovoltaic unit fails to supply power, the second relay is configured to control the power supply of the photovoltaic unit of the previous stage to be connected to the photovoltaic unit of the next stage;
the optical coupler is configured to control the switching transistor to be in a turned-on state so that the first coil is powered on, when the power supply of the bound photovoltaic unit normally supplies power; and the optical coupler is configured to control the switching transistor to be in a turned-off state so that the first coil is powered off, when the power supply of the bound photovoltaic unit fails to supply power.

2. The system according to claim 1, wherein the processing module is specifically configured to:
determine that the bound photovoltaic unit is faulty and output a fault information, upon detecting that the communication signals output by one of the monitoring units within a first preset duration are all unprocessed communication signals.

3. The system according to claim 1, wherein the processing module is specifically configured to:
determine that the bound photovoltaic unit is faulty and output a fault information, upon detecting that the communication signals output by one of the monitoring units within a preset period of time are all unprocessed communication signals.

4. The system according to claim 1, wherein the processing module is further configured to acquire a preset identification information in a faulty photovoltaic unit, and acquire a position information of the faulty photovoltaic unit according to the identification information and a preset photovoltaic planar model corresponding to the at least one group of photovoltaic arrays.

5. A photovoltaic fault monitoring method for use in a photovoltaic fault monitoring system, wherein the photovoltaic fault monitoring system comprises:
at least one group of photovoltaic arrays, each of the photovoltaic arrays comprising multiple stages of photovoltaic modules connected in series, and each of the stages of photovoltaic modules comprising a photovoltaic unit and a monitoring unit bound with the photovoltaic unit;
a processing module, being connected with the at least one group of photovoltaic arrays, and being configured to acquire the communication signal output by each monitoring unit in the photovoltaic arrays, and determine whether the bound photovoltaic unit is faulty according to the communication signal output by each monitoring unit;
wherein the monitoring unit comprises a conversion unit, a main control unit, an uplink port and a downlink port;
the conversion unit is configured to directly output the received communication signal when a power supply of the bound photovoltaic unit fails to supply power, and transmit the received communication signal to the main control unit when the power supply of the bound photovoltaic unit normally supplies power; and the main control unit is configured to process the received communication signal and output the processed communication signal;

the uplink port is connected with the monitoring unit of the photovoltaic modules of a previous stage;

the downlink port is connected with the monitoring unit of the photovoltaic modules of a next stage;

wherein the conversion unit comprises a first relay, a second relay, a switching transistor and an optical coupler;

wherein a first coil in the first relay is connected to the power supply of the bound photovoltaic unit; a first input terminal of the first relay is connected to a transmitting port of the uplink port, a second input terminal of the first relay is connected to a receiving port of the uplink port, a first output terminal and a second output terminal of the first relay are connected to the main control unit, a third output terminal of the first relay is connected to a transmitting port of the downlink port, and a fourth output terminal of the first relay is connected to a receiving port of the downlink port;

the second relay is connected with the power supply of the photovoltaic unit of the previous stage, the power supply of the bound photovoltaic unit and the photovoltaic unit of the next stage;

the optical coupler is connected with the second relay, the switching transistor and the first coil, the switching transistor is connected with the first coil;

wherein when the power supply of the bound photovoltaic unit normally supplies power, the first relay is configured to control the uplink port to be connected to the main control unit so as to transmit the communication signal received by the uplink port to the main control unit; and when the power supply of the bound photovoltaic unit fails to supply power, the first relay is configured to control the uplink port to be connected to the downlink port so as to directly output the communication signal received by the uplink port to the downlink port;

when the power supply of the bound photovoltaic unit normally supplies power, the second relay is configured to control the power supply of the photovoltaic unit of the previous stage to be connected to a common contact; and when the power supply of the bound photovoltaic unit fails to supply power, the second relay is configured to control the power supply of the photovoltaic unit of the previous stage to be connected to the photovoltaic unit of the next stage;

the optical coupler is configured to control the switching transistor to be in a turned-on state so that the first coil is powered on, when the power supply of the bound photovoltaic unit normally supplies power; and the optical coupler is configured to control the switching transistor to be in a turned-off state so that the first coil is powered off, when the power supply of the bound photovoltaic unit fails to supply power;

wherein the photovoltaic fault monitoring method comprises:

inputting a detecting communication signal to the at least one group of photovoltaic arrays;

acquiring a communication signal fed back by each monitoring unit in the photovoltaic array based on the detecting communication signal; and determining whether the bound photovoltaic unit is faulty by determining whether the photovoltaic unit normally supplies power according to the communication signal output by each monitoring unit.

6. The method according to claim 5, further comprising:

acquiring a preset identification information of a faulty photovoltaic unit;

acquiring a preset photovoltaic planar model corresponding to the at least one group of photovoltaic arrays; and acquiring a position information of the faulty photovoltaic unit according to the identification information and the photovoltaic planar model, wherein the photovoltaic planar model contains an identification information of each of the photovoltaic units and a position information corresponding to the identification information.

7. The method according to claim 6, wherein before inputting the detecting communication signal to the at least one group of photovoltaic arrays, the method further comprises:

receiving the identification information of the bound photovoltaic unit and the position information in the photovoltaic array where the bound photovoltaic unit is located which are sent by each monitoring unit in the at least one group of photovoltaic arrays; and performing modeling on the at least one group of the photovoltaic arrays to obtain the photovoltaic planar model based on the identification information of the bound photovoltaic unit and the position information in the photovoltaic array where the bound photovoltaic unit is located which are sent by each monitoring unit.

8. The method according to claim 5, wherein the operation of determining whether the bound photovoltaic unit is faulty according to the communication signal output by each monitoring unit comprises:

determining that the bound photovoltaic unit is faulty and outputting fault information, upon detecting that the communication signals output by one of the monitoring units within a first preset duration are all unprocessed communication signals.

9. The method according to claim 5, wherein the operation of determining whether the bound photovoltaic unit is faulty according to the communication signal output by each monitoring unit comprises:

determining that the bound photovoltaic unit is faulty and outputting the fault information, upon detecting that communication signals output by one of the monitoring units within a preset period of time are all unprocessed communication signals.

10. The method according to claim 5, wherein the method further comprises:

acquiring a preset identification information of a faulty photovoltaic unit, and acquiring a position information of the faulty photovoltaic unit according to the identification information and a preset photovoltaic planar model corresponding to the at least one group of photovoltaic arrays.

11. A computer-readable non-volatile storage medium having a computer program stored thereon, wherein the computer program, when executed by a processor, implements steps of the method according to claim 5.

* * * * *